Patented May 4, 1948

2,441,023

UNITED STATES PATENT OFFICE 2,441,023

LUBRICATING OIL COMPOSITIONS CONTAINING POLYMERIZED ALLYL ESTERS OF CARBOXYLIC ACIDS

Robert G. Larsen, Albany, and Kenneth E. Marple, Oakland, Calif., assignors to Shell Development Company, San Francisco, Calif., a corporation of Delaware No Drawing. Application January 26, 1945, Serial No. 574,816

4 Claims. (Cl. 252—56)

This invention relates to polymeric allyl-type esters of higher saturated monocarboxylic aliphatic acids, the polymers of which are useful as additives for lubricating oil and the like.

The relationship of the change in viscosity of a lubricating oil with change in temperature is commonly expressed by the term "viscosity index" (V. I.), as explained by Dean and Davis in Chemical and Metallurgical Engineering, 36, 618 (1929). Oils having a high viscosity index are preferred for most purposes. The viscosity index of oils may be increased by the addition of certain soluble high molecular weight substances. Not all of these substances are satisfactory in practical use, however. Suitable V. I. improvers must be effective in very small amounts, must bring about a relatively great improvement in V. I. in proportion to the accompanying increase in viscosity, must have a relatively permanent effect, and must be free from objectionable action such as carbonization, etc.

A large body of V. I. improvers consists of high molecular weight hydrocarbons such as rubber, hydrogenated rubber, polyisobutylene and other polymeric olefins. More recently there have come into use acryloid polymers, which are polymeric esters of acrylic and substituted acrylic acids. Substances produced by the polymerization of common unsaturated alcohols and esters of unsaturated alcohols with short chain acids such as polyvinyl acetate, polyallyl acetate, etc., have been found unsuitable. It has been stated that the treatment of many otherwise unsuitable polymeric unsaturated alcohol derivatives with sulfur monochloride renders them useful as lubricating oil additives.

It is an object of the present invention to provide new chemical substances which are polymers of unsaturated alcoholic derivatives useful as lubricating oil additives without sulfurization. Another object is to provide new lubricant compositions. Another object is to provide new unsaturated alcohol derivatives. Other objects will be apparent from the description of the invention given hereinafter.

These objects are accomplished in accordance with the present invention by polymeric type esters of allyl alcohols with saturated monocarboxylic aliphatic acids of 8 to 13 carbon atoms inclusive, and by improved lubricants containing them. Even without treatment with sulfur monochloride or other sulfurization treatment the new polymers in small amounts are effective in bringing about substantial improvement in the V. I. without proportionately increasing the viscosity of mineral lubricating oils.

The new compounds are polymers of esters of real or hypothetical allyl alcohols with saturated monocarboxylic aliphatic acids of 8 to 13 carbon atoms inclusive. Examples of such acids are caprylic, pelargonic, capric, undecoic, lauric, tridecoic, and the corresponding branched-chain acids. The acids may be substituted by elements or groups such as hydroxy, halogen and the like, although unsubstituted acids are preferred.

Allyl alcohols are compounds having a double bond of aliphatic character between two carbon atoms one of which is attached directly to a saturated carbon atom which in turn is attached directly to an alcoholic hydroxyl group. They may be represented by the general structural formula.

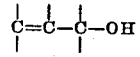

Preferred allyl alcohols have a terminal methylene group attached directly by an olefinic double bond to a carbon atom which in turn is attached directly to a saturated carbinol carbon atom, as represented by the formula

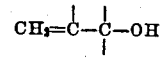

Allyl alcohols useful in the present invention preferably have not more than about eighteen carbon atoms and have at least one unsaturated carbon-to-carbon linkage for each six carbon atoms.

Representative examples of preferred allyl-type alcohols are the following:

allyl alcohol
methallyl alcohol
ethallyl alcohol
chloroallyl alcohol
buten-1-ol-3
penten-1-ol-3
hexen-1-ol-3
3-methyl-buten-1-ol-3
3-methyl-penten-1-ol-3
2-methyl-buten-1-ol-3
2-methyl-penten-1-ol-3
2,3-dimethyl-buten-1-ol-3
hepten-1-ol-3
4-methyl-hexen-1-ol-3
5-methyl-hexen-1-ol-3
4,4'-dimethyl-penten-1-ol-3 octen-1-ol-3
6-methyl-hepten-1-ol-3
4-methyl-hepten-1-ol-3
4,4'-dimethyl-hexen-1-ol-3
3-phenyl-propen-1-ol-3
3-tolyl-propen-1-ol-3
3-xylyl-propen-1-ol-3
4-phenyl-buten-1-ol-3
4-tolyl-buten-1-ol-3
4-xylyl-buten-1-ol-3
3-naphthyl-propen-1-ol-3
4-chloro-buten-1-ol-3
pentadien-1,4-ol-3
hexen-1-yn-5-ol-3
2-methyl-penten-1-yn-4-ol-3
2,5-dimethyl-hexadien-1,5-ol-4

Other allyl alcohols are crotyl alcohol
tiglyl alcohol
3-chloro-buten-2-ol-1
cinnamyl alcohol
hexadien-2,4-ol-1
hexadien-2,5-ol-1
butadien-2,3-ol-1 hexadien-3,5-ol-2
2-methyl-hexen-2-ol-1
2-methyl-penten-2-ol-1
3,7-dimethyl-octadien-2,7-ol-1
cyclopenten-2-ol-1
cyclohexen-2-ol-1, etc.

Allyl alcohol is preferred.

Examples of some of the unsaturated esters with which the invention is concerned are allyl caprylate, allyl pelargonate, allyl caprate, allyl laurate, methallyl caprate, methallyl laurate, chloroallyl laurate, (buten-1-yl-3) laurate, (cyclopenten-2-yl-1) laurate, etc. There are, of course, many others. Allyl laurate is preferred.

The monomeric esters may be produced by numerous methods of synthesis. One method comprises the direct esterification of the acid with the alcohol, preferably in the presence of a catalyst such as para-toluene sulfonic acid, a mineral acid or the like. Another method comprises ester-exchange, in which the acid is reacted with the ester of the allyl alcohol with another acid, e. g., acetic acid. Another method comprises acid-exchange involving an allyl alcohol and an ester of the acid with another alcohol, e. g., methyl, ethyl, etc., alcohol. Another method comprises ester-interchange, in which an ester of an allyl alcohol with another acid is reacted upon an ester of the acid with another alcohol. Methods of esterification involving the alkenyl halides or the acyl halides may be used. Many other methods of synthesis are suitable. Polymerization inhibitors, such as tannic acid and the like, may be present. In general, those catalysts and conditions which have been found suitable for other esterification reactions may be employed in the production of the present esters. The compounds may be separated from the other ingredients of the reaction mixture and purified by known or special methods.

The monomers are in general colorless liquids. Some of the higher members, e. g., esters of long-chain unsaturated alcohols, may be solids.

The polymers may be produced by the polymerization of the corresponding monomers, or by the conversion of polymers of derivatives of the monomers to the desired polymers. For instance, a polymeric allyl alcohol, which may be produced by the polymerization of an allyl alcohol or by hydrolysis or alcoholysis of an ester or the like, may be esterified by a higher saturated monocarboxylic acid. Preferred esters have at least about 50% of the hydroxyl groups of the polymeric allyl-type alcohol esterified with the designated higher acid.

Polymerization may be effected by heating in the presence of a polymerization catalyst. Oxygen-containing polymerization catalysts are suitable. Benzoyl peroxide is suitable. Other oxygen-containing catalysts include lauryl peroxide, acetyl peroxide, metallic peroxides, hydrogen peroxide and the like. Tertiary butyl hydroperoxide (often called tertiary butyl peroxide) is effective, as are also di(tertiary alkyl) peroxides, such as di(tertiary butyl) peroxide. Metals and metallic salts are effective. Mixtures of catalysts may be used. From about 0.1 to about 10% of catalyst is generally satisfactory, the more narrow range of from about 1% to about 5% being preferred. Under proper conditions it may be unnecessary to use any catalyst at all.

The temperature used in polymerization is dependent upon the compound involved, upon the catalyst employed and upon the other conditions under which the reaction is carried out. Temperatures of from about 50° C. to about 300° C. may be used. In the lower temperature range, e. g., from about 50° C. to about 125° C., it may be desirable to use a catalyst such as benzoyl peroxide which is most effective at that range. At higher temperatures, e. g., from about 125° C. to about 300° C., tertiary butyl hydroperoxide, a di(tertiary alkyl) peroxide, or a metallic salt may be more effective.

The reaction may be carried out in a continuous or batchwise manner. Atmospheric or super-atmospheric pressures are customary, although in many cases reduced pressures may be employed. The reaction mixture may be provided with a blanket of an inert gas such as nitrogen or carbon dioxide. The reaction can be carried out in bulk (in the absence of diluents), in solution or in dispersion.

The polymers may be separated from any other ingredients of the polymerization reaction mixture, washed and purified by known or special methods.

The polymers when pure are substantially colorless. They vary from readily mobile liquids to solid substances. They have molecular weights ranging from a few hundred to several thousand (polymerization degree of 4.3 to 12.1). The lower molecular weight polymers may be used as lubricating oil additives to increase viscosity, reduce corrosion, increase resistance to discoloration, improve the pour point, etc. For use as V. I. improvers, high molecular weight polymers are preferred.

Lubricants can be produced by the addition of the new polymers to lubricating oil, greases, waxes and the like. The polymers may be used with synthetic lubricants comprising polymerization products of unsaturated hydrocarbons such as ethylene, the propylenes, the butylenes, etc. Suitable synthetic lubricants may also be produced by the Friedel-Crafts polymerization of selected hydrocarbon fractions obtained by cracking hydrocarbon waxes, etc. The new polymers are valuable additives to other lubricating compositions and to oils used for other purposes. Where it is desired merely to improve the V. I. of a lubricant, only relatively small amounts of the polymers need usually be added, e. g., 5% or less by weight of the lubricant. Amounts as low as about 0.2% may be effective. Where substantial bodying, i. e., increase in viscosity, is required amounts as large as 20% or even more may be used. Larger amounts may be employed with natural or synthetic lubricants in the production of plastic compositions useful as greases.

The employment of these polymers in lubricating compositions is not limited to their association with petroleum or mineral oils. They may be used in petrolatum, paraffin wax, animal or vegetable oils or the like. They may be used in rolling oils, in tinning oils, in metal forming oils, as components of hydraulic fluids, launching grease, in rust-proofing compositions, etc. They may be used in conjunction with asphalts and the like in the production of roadways, roofing compositions, caulking, etc.

The new polymers have many other uses. They act as plasticizers for plastics and elastomers. They may be employed in paints, lacquers, enamels and varnishes. They may be used in the production of drying oils.

In place of the polymers as produced there may be used products obtained by hydrogenation, sulfurization, sulfonation, halogenation, etc. The polymers may be subjected to partial hydrolysis, acetalization, etc. Separately produced polymers may be used in admixture with one another or with plastic or elastomeric substances of many kinds. Dyes, pigments, solvents, stabilizers, and other modifiers may be added.

Some of the many ways in which the invention may be practiced are illustrated by the following examples, in which parts are on a weight basis.

Example I

Allyl laurate was produced by refluxing a mixture of lauric acid, 596 grams, allyl alcohol, 500 cc., benzene, 250 cc., and para-toluene sulfonic acid, 2.5 grams under a separating head. At the end of 3 hours, 68 cc. of water had been removed as a benzene-water azeotrope. The residue was washed with dilute aqueous sodium hydroxide, washed with aqueous sodium chloride, dried over sodium sulfate and distilled. The allyl laurate was collected at between 123.8° C. and 128.2° C. at 2 mm. of mercury pressure. The yield was 79%.

Example II

Allyl acetate was polymerized at 200° C. in the presence of anhydrous nickel acetate catalyst. The resulting polyallyl acetate, which had a molecular weight of about 900 (polymerization degree of 9), was converted to polyallyl alcohol by heating with allyl alcohol. A mixture of polyallyl alcohol, 15 grams, and lauric acid, 55 grams, was heated for two hours at 225° C. in an atmosphere of nitrogen. The mixture was then dissolved in 50 cc. of petroleum ether. Polyallyl laurate was precipitated from this solution by the addition of acetone and methyl alcohol. The ester was separated by filtration and purified by removing material boiling below about 135° C. under 15 mm. of mercury pressure. Polyallyl laurate thus prepared was an orange brown viscous liquid having a refractive index (20/D) of 1.4724.

Example III

Allyl laurate prepared in accordance with Example I was polymerized in the presence of air by heating at 200° C. for 65 hours. The polymer had a molecular weight of 1300 (polymerization degree of 5.4).

Example IV

A mixture of allyl laurate, 100 parts, prepared in accordance with Example I, and tertiary butyl hydroperoxide, 1.1 parts, was heated in the presence of nitrogen in the absence of air at 200° C. for 65 hours. The product had a molecular weight of 1030 (polymerization degree of 4.3).

Example V

Allyl laurate was polymerized at 200° C. for 65 hours in the presence of nitrogen in the absence of air, using 1.4% of anhydrous nickel acetate.

Example VI

Allyl laurate, 100 parts, prepared in accordance with Example I, in the presence of benzoyl peroxide, 1 part, was placed in a glass vessel and polymerized 4½ days at 70° C. in the presence of nitrogen in the absence of air. The polymer was a viscous yellow liquid, solidifying at 10° C., having a molecular weight of 2900 (polymerization degree of 12.1).

Example VII

A sufficient amount of polyallyl laurate prepared in accordance with Example VI was added to a mineral lubricating oil having a kinematic viscosity in centistokes of 51.8 at 100° C. to raise the viscosity at the same temperature to 62.3. The V. I. of the mixture was 90 as compared to a V. I. of 61 for the unmodified oil.

Example VIII

The same lubricating oil used in Example VII was modified by the addition of polyallyl laurate prepared in accordance with Example VI sufficient to produce a mixture having a kinematic viscosity of 77.37 at 100° C. The V. I. of the mixture was 107.

Example IX

Methallyl laurate is prepared by refluxing methallyl alcohol with lauric acid in the presence of benzene and para-toluene sulfonic acid. The product is polymerized by heating with 1% benzoyl peroxide in an atmosphere of nitrogen. The polymethallyl laurate is used as a lubricating oil additive.

Example X

Crotyl laurate is prepared by refluxing crotyl alcohol with lauric acid in the presence of benzene and para-toluene sulfonic acid as catalyst.

Example XI

Allyl caprate is produced by reacting allyl alcohol with capric acid in the manner described in Example I. The polyallyl caprate produced by polymerization in the presence of benzoyl peroxide is used as a lubricating oil additive.

We claim as our invention:

1. A lubricating composition comprising an oily lubricant and a sufficient amount to increase appreciably the viscosity index of said oily lubricant of a polymer of an ester of an allyl alcohol containing 3 to 18 carbon atoms with a saturated monocarboxylic acid containing 8 to 13 carbon atoms, said ester having a double bond of aliphatic character between two carbon atoms one of which is attached directly to a saturated carbon atom which in turn is attached directly to the oxygen atom of the carboxyl group of the ester, and said polymer, having a degree of polymerization of 4.3 to 12.1, being obtained by heating and polymerizing said ester at 50° C. to 300° C. in intimate mixture with a polymerization catalyst of the group consisting of peroxides and molecular oxygen.

2. A lubricating composition comprising a hydrocarbon lubricating oil and a sufficient amount to increase appreciably the viscosity index of said oil of a polymer of an ester of an allyl alcohol containing 3 to 18 carbon atoms with a saturated monocarboxylic acid containing 8 to 13 carbon atoms, said ester having a double bond of aliphatic character between two carbon atoms one of which is attached directly to a saturated carbon atom which in turn is attached directly to the oxygen atom of the carboxyl group of the ester, and said polymer, having a degree of polymerization of 4.3 to 12.1, being obtained by heating and polymerizing said ester at 50° C. to 300° C. in intimate mixture with a polymerization catalyst of the group consisting of peroxides and molecular oxygen.

3. A lubricating composition of an improved viscosity index comprising a hydrocarbon mineral lubricating oil and from 0.2% to 20% of a polymer of an ester of an allyl alcohol containing 3 to 18 carbon atoms with a saturated monocarboxylic acid containing 8 to 13 carbon atoms, said ester having a double bond of aliphatic character between two carbon atoms one of which is attached directly to a saturated carbon atom which in turn is attached directly to the oygxen atom of the carboxyl group of the ester, and said polymer, having a degree of polymerization of 4.3 to 12.1, being obtained by heating and polymerizing said ester at 50° C. to 300° C. in intimate mixture with a polymerization catalyst of the group consisting of peroxides and molecular oxygen.

4. A lubricating composition of improved viscosity index comprising a hydrocarbon mineral lubricating oil and from 0.2% to 20% of a polymer of allyl laurate having a degree of polymerization from 4.3 to 12.1 obtained by heating and polymerizing allyl laurate at 50° C. to 300° C. in the presence of an organic peroxide polymerization catalyst.

ROBERT G. LARSEN.
KENNETH E. MARPLE.

REFERENCES CITED

The following references are of record in the file of this patent:

UNITED STATES PATENTS

| Number | Name | Date |
|---|---|---|
| 2,384,595 | Blair | Sept. 11, 1945 |
| 2,374,081 | Dean | Apr. 17, 1945 |
| 2,370,300 | Farrington | Feb. 27, 1945 |
| 2,342,113 | Blair | Feb. 22, 1944 |
| 2,330,773 | Zimmer | Sept. 28, 1943 |
| 2,236,590 | Backoff | Apr. 1, 1941 |
| 2,160,941 | Britton | June 6, 1939 |
| 2,123,641 | Wiezevich | July 12, 1938 |
| 2,091,627 | Bruson | Aug. 31, 1937 |

FOREIGN PATENTS

| Number | Country | Date |
|---|---|---|
| 484,964 | Great Britain | May 12, 1938 |